No. 823,445. PATENTED JUNE 12, 1906.
E. SCHRAMM.
MANUFACTURE OF IMITATION SILK.
APPLICATION FILED MAR. 12, 1906.
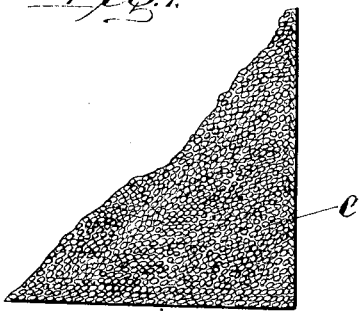
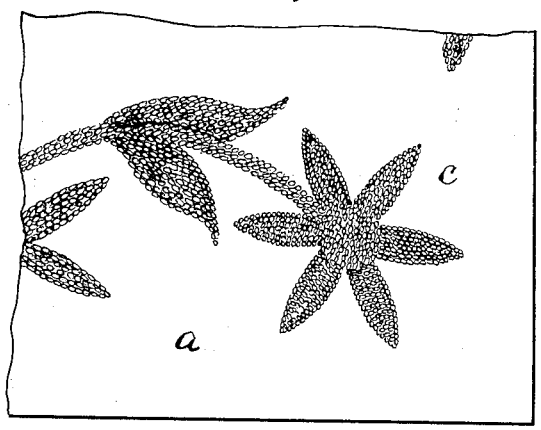
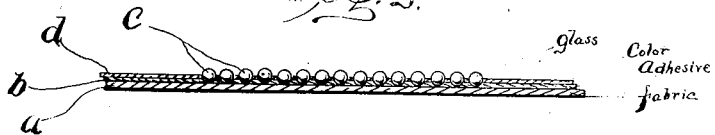

UNITED STATES PATENT OFFICE.

ERNST SCHRAMM, OF FRIEDRICHSHAGEN, NEAR BERLIN, GERMANY.

MANUFACTURE OF IMITATION SILK.

No. 823,445.  Specification of Letters Patent.  Patented June 12, 1906.

Application filed March 12, 1906. Serial No. 305,692.

*To all whom it may concern:*

Be it known that I, ERNST SCHRAMM, a citizen of Germany, residing at No. 3 Victoriastrasse, Friedrichshagen, near Berlin, Germany, have invented certain new and useful Improvements in the Manufacture of Imitation Silk; and I do hereby declare the following to be a full, clear, and exact description of the invention, such as will enable others skilled in the art to which it appertains to make and use the same.

The subject of my invention is a new kind of imitation of silks and silk embroidery of all descriptions, which is much easier and cheaper to manufacture than real silk or silk embroidery and possesses a gloss which is not only a perfect imitation of that peculiar to silk, but is even superior to it. The invention also relates to a process of manufacturing this imitation silk.

In order that the subject-matter of this invention may be fully understood, reference is hereby made to the accompanying drawings, in which—

Figure 1 is a fragment of fabric treated according to my invention. Fig. 2 represents a fragment of fabric having an embroidered effect, and Fig. 3 is a greatly-enlarged section through a part of Fig. 2.

The new product consists of a base $a$, of any suitable material, (such as wood, leather, fabric, paper, or the like,) of a plastic adhesive medium $b$, (such as pasty oil or size-colors, or the like,) adhering to the said base, and of very minute glass globules $c$, partly embedded in the adhesive medium, the diameter of which globules should preferably not exceed a fraction of a millimeter. These glass globules must not be confused with the glass beads of commerce, which are of very much larger diameter than the minute glass globules here referred to and which do not possess the quality of imitating the gloss of silk, nor have these globules any resemblance to glass dust or so-called "mica-snow," consisting of fine splinters, as these products likewise do not produce a silky gloss, but, on the contrary, in view of the irregular reflection of the light on their variously-lying faces, only cause the surface covered by them to glisten or shine at particular parts.

The process of manufacturing the new product consists in covering, for instance, a white linen fabric with a plastic adhesive agent consisting, for example, of vermilion ground to a paste, with the mixture known in the trade as "mixdion," (consisting of a drying-oil mixed with resin or varnish,) and then strewing the glass globules upon the still moist surface. The glass globules sink into the adhesive medium to the depth of about one-third their diameter and on drying will be firmly held by it. Instead of the colored adhesive agent a colorless one may be employed, which before the glass globules are applied to it may be painted with any desirable colors, as at $a$. The vertical rays of light striking the surface covered with the glass globules do not impart to it any particular gloss. The surface, however, when rays fall on it at an angle exhibits a peculiar silky gloss which is much superior to the gloss of natural silk.

In order, for instance, to produce on a white linen cover the imitation of silk embroidery with red flowers and green leaves, as indicated in Fig. 2, the procedure would be as follows: Those places on the white fabric which are to be covered with embroidery must first be gone over with the pasty mixture of mixdion and color, (in the present case, for instance, vermilion and chrome green,) next any shading that may be necessary, produced by painting over the places with lighter or darker colors, and then glass globules strewn on the still moist parts. After drying the covered parts form a firm durable washable coating, presenting the exact appearance of an extremely glossy and beautiful silk embroidery. It is advantageous to boil the oil before use, so as to thicken it somewhat.

Having thus described my invention, what I claim as new, and desire to secure by Letters Patent, is—

1. An imitation silk, consisting of a base of suitable material, a plastic adhesive agent adhering thereto, and very minute glass globules partly embedded in the adhesive agent, substantially as described.

2. An imitation silk, consisting of a base of pliant material, a plastic adhesive agent adhering thereto, and very minute glass globules partly embedded in the adhesive agent, substantially as described.

3. An imitation silk, consisting of a base of suitable material, a plastic colored adhesive agent adhering thereto, and very minute glass globules partly embedded in the adhesive agent, substantially as described.

4. An imitation silk, consisting of a base of suitable material, a plastic adhesive agent adhering thereto, a layer of color partly covering the adhesive agent, and very small glass globules embedded in the layer of color and the adhesive agent, substantially as described.

5. The process of manufacturing an imitation silk, consisting in coating a base of suitable material at desired parts with a plastic adhesive agent, and in embedding in the latter part of the surface of very small glass globules, substantially as described.

6. The process of manufacturing an imitation silk, consisting in coating a base of suitable material at desired parts with a plastic adhesive agent, in covering the latter at desired parts with paint, and in then embedding in the adhesive agent part of the surface of very small glass globules, substantially as described.

7. The process of manufacturing an imitation silk, consisting in coating a fabric at desired parts with a paste color, and strewing the layer of paint, before it dries, with small glass globules, substantially as described.

8. The process of manufacturing an imitation silk, consisting in coating a fabric at desired parts with a paste color, applying to the layer of paint at desired parts other paints, and strewing the surface, before it dries, with small glass globules, substantially as described.

In testimony whereof I hereunto affix my signature in the presence of two witnesses.

ERNST SCHRAMM.

Witnesses:
HENRY HASPER,
WOLDEMAR HAUPT.